United States Patent [19]
Albinson et al.

[11] Patent Number: 5,121,134
[45] Date of Patent: Jun. 9, 1992

[54] PROVIDING A SURFACE WITH SOLVENT-WETTABLE AND SOLVENT-NON-WETTABLE ZONE

[75] Inventors: Rosemary B. Albinson, London; Mark R. Shepherd, Royston, both of England

[73] Assignee: XAAR Limited, Cambridge, England

[21] Appl. No.: 497,735

[22] Filed: Mar. 19, 1990

Related U.S. Application Data

[63] Continuation-in-part of Ser. No. 491,319, Mar. 8, 1990, abandoned.

[30] Foreign Application Priority Data

Mar. 20, 1989 [GB] United Kingdom ............. 8906379

[51] Int. Cl.$^5$ ............................................ B41J 2/165
[52] U.S. Cl. ........................... 346/1.1; 346/140 R; 427/259; 427/271
[58] Field of Search ............ 346/1.1, 140; 427/259, 427/258, 270, 271, 272; 156/643

[56] References Cited

U.S. PATENT DOCUMENTS

| | | | |
|---|---|---|---|
| 2,995,461 | 8/1961 | Boicey | 427/259 X |
| 3,139,352 | 6/1984 | Coxner | 427/259 |
| 3,662,399 | 5/1972 | Yanou et al. | 346/140 |
| 4,368,476 | 1/1983 | Uehara et al. | 346/140 R |
| 4,643,948 | 2/1987 | Diaz et al. | 428/422 |
| 4,658,269 | 4/1987 | Rezanka | 346/75 |
| 4,940,996 | 7/1990 | Paton et al. | 346/140 R |
| 4,942,409 | 7/1990 | Paton et al. | 346/140 R |
| 5,010,356 | 4/1991 | Albinson | 346/140 R |

FOREIGN PATENT DOCUMENTS

| | | |
|---|---|---|
| 0177316 | 4/1986 | European Pat. Off. |
| 0309146 | 3/1989 | European Pat. Off. |
| 0339926 | 11/1989 | European Pat. Off. |
| 178065 | 9/1985 | Japan |
| 184852 | 9/1985 | Japan |
| 1175527 | 12/1969 | United Kingdom |
| 2019254 | 10/1979 | United Kingdom |

OTHER PUBLICATIONS

Shih, Peter T. K.; Antiwetting Organosilanes and Composite Films for Ink Jet Nozzles; IBM IDB, vol. 7, No. 5, Sep./Oct. 1982, p. 321.

*Primary Examiner*—Joseph W. Hartary
*Attorney, Agent, or Firm*—Marshall, O'Toole, Gerstein, Murray & Bicknell

[57] ABSTRACT

A method of providing the surface area of a substrate with a first zone which is solvent-wettable and a second zone which is solvent-non-wettable, and which is particularly suitable for application to the printheads and nozzle plates of drop-on-demand ink jet printers or like products where the spacing between zones of the same kind can be as little as just tens of microns, and wherein the solvent-non-wettable zone displays excellent abrasion resistance and resistance to solvents, is virtually non-wettable by a wide range of solvents and bonds well even to plastics substrates, comprises:

(i) providing a surface having good solvent wettability at least over that part of the area of the substrate which is to form said first zone;

(ii) providing said area with a first layer which comprises sioxic material which bonds to the substrate and which is in contact with the substrate over at least that part of the area which is to form said second zone;

(iii) providing said area with an overlayer comprising organic fluorocompound which bonds to said first layer and provides a surface of poor solvent wettability, said overlayer being in contact with said first layer over at least that part of the area which is to form said second zone; and (iv) by etching or washing, removing overlying material from said surface having good solvent wettability over that part of the area which is to form said first zone whereby to expose said surface.

24 Claims, 8 Drawing Sheets

PROVIDING A SURFACE WITH SOLVENT-WETTABLE AND SOLVENT-NON-WETTABLE ZONE

CROSS-REFERENCE TO RELATED APPLICATION

This is a continuation-in-part of Applicants' copending, commonly assigned application Ser. No. 07/491,319 filed Mar. 8, 1990, now abandoned.

BACKGROUND OF THE INVENTION

1. Field of the Invention

This invention relates to providing a substrate with a surface having an area part of which has good solvent-wettability and another part of which has poor solvent-wettability, e.g. so that a solvent which comes into contact with the area tends to concentrate on the first-mentioned part while the second-mentioned part remains essentially dry.

2. Description of Related Technology

One application for the process of the invention is in the field of drop-on-demand ink jet printers of the kind having a printhead which includes an array of nozzles through which liquid ink drops are ejected on demand on to a surface to be printed.

In one design of printhead, which is described in our copending UK application No. 8810241.3 and in published European Patent Application No. 339,926 (Nov. 2, 1989), the nozzles are formed in the head itself or on a separate nozzle plate which is mounted on the head, and a house-keeping manifold is located on the head or on the nozzle plate for supplying environmental fluids to or exhausting such fluids from the region of the orifices. In one embodiment of this design of printhead, it is desirable for at least an annular zone surrounding each orifice to be substantially non-wettable by the ink employed and for at least a part of the remaining surface of the head (or nozzle plate where used) to be wettable so that the manifold may be bonded securely to the head (or nozzle plate).

In another design of printhead, it can be desirable for a small area of the head or nozzle plate adjacent each orifice to have a surface which is readily wetted by the ink and for another area immediately surrounding that area to be essentially non-wettable.

It is known that many organic compounds containing chemically combined fluorine, e.g. fluoropolymers and polyfluorinated organic compounds, can provide surfaces which have generally very poor solvent-wettability; see, for example, U.S. Pat. Nos. 4,368,476 and 4,643,948 and published European Application No. 177,316. However it is difficult to bond them adequately to many substrates.

The problem is particularly acute with the high softening point plastics materials, especially the condensation polymers having aromatic groups such as polyimides, polycarbonates, polysulphones, polyesters and polyether ether ketones, which are favoured for the production of printheads and nozzle plates of drop-on-demand ink jet printers.

We have found that the adhesion of such compounds, hereinafter referred to as organic fluorocompounds, to substrates, and especially the aforementioned high softening point plastics materials, may be improved by use of a keying interlayer of siloxic material, by which we mean a material made up mainly of silicon atoms linked together by oxygen atoms; i.e. having —Si—O—Si— groups.

However, the formation of zones having good solvent wettability and zones having poor solvent wettability from such a system on printheads or nozzle plates of drop-on-demand ink jet printers using conventional techniques has presented difficulties.

Specifically, the use of a stand-alone mask to protect areas of the printhead which are not to be coated is generally precluded because the liquid material favoured for forming the siloxic layer tends to creep under it. The alternative of an adhesive mask, on the other hand, is precluded by the tendency of such masks to dimensional instability which is exacerbated by the miniature scale of the operation. Distances between adjacent zones which are to be coated may be of the order of only tens of microns.

At this miniature scale, the fact that feature sizes are limited by the thickness of the mask presents yet a further limitation since at mask thicknesses which enable zones of the desired size to be coated, the mask tends to be too fragile.

Deposition of masks by painting or printing has also proved impracticable.

Yet a further problem is that the contours produced by the use of a mask tend to cause unacceptable differences in the thickness of the siloxic layer which can be exacerbated by differences in the wettability of the surfaces of the mask and substrate, respectively, by the liquid employed to form the siloxic layer.

We have now developed a method of forming zones having good solvent wettability and zones having poor solvent wettability on a substrate such as a drop-on-demand ink jet printhead or nozzle plate in which these disadvantages are reduced or avoided.

SUMMARY OF THE INVENTION

According to the present invention there is provided a method of providing a substrate with a surface having an area which is divided into a first zone having good solvent-wettability and a second zone having poor solvent-wettability, said method including the steps of:

(i) providing a surface having good solvent wettability at least in that part of the area of the substrate which is to form said first zone;

(ii) providing said area with a first layer which comprises siloxic material which bonds to the substrate and which is in contact with the substrate over at least that part of the area which is to form said second zone;

(iii) providing said area with an overlayer comprising organic fluorocompound which bonds to said first layer and provides a surface of poor solvent wettability, said overlayer being in contact with said first layer over at least that part of the area which is to form said second zone; and (iv) by etching or washing, removing overlying material from said surface having good solvent wettability over that part of the area which is to form said first zone whereby to expose said surface.

It is to be understood that the references to good solvent-wettability and poor solvent-wettability relate to the relative wettabilities of the surfaces by a solvent. In general, however, the surface of poor solvent-wettability is preferred to be essentially non-wettable by the solvent in question. By means of the invention surfaces of poor wettability can be provided which are durable and resistant to most solvents employed for printing inks and which have excellent solvent-repellant characteristics.

The surface of good solvent wettability may be provided, as desired, by the substrate itself, by the layer of siloxic material or by a further layer.

Examples of siloxic materials that may be used in the process of this invention include silicon oxide and organic siloxanes. Organic siloxanes are preferred, however, because of their combination of wettability by a variety of solvents and the ability to form a strong bond with a variety of substrates, especially the aforementioned polymeric materials, and with organic fluorocompounds.

By a "siloxane" is meant herein a material obtainable by curing, and thereby forming Si—O—Si linkages, a silane which has hydrolysable groups attached to a silicon atom. The siloxane layer may be formed, for example, by forming a layer of the silane and thereafter heating or otherwise effecting its cure, e.g. as described in our co-pending British patent application 8824436.3.

The principal feature of the process of the present invention is that both the layer comprising siloxic material and the overlayer comprising organic fluorocompound are applied over the whole area from which the first zone and second zone are to be formed. Thus problems of masking the substrate prior to deposition of the layer of siloxic materials are avoided.

Thereafter, the zone of good solvent wettability is formed by the removal of material and the removal is effected by etching or washing. Etching may be of for example, by chemical attack or by ablation with a high energy beam such as a laser.

As will be more fully understood from the detailed discussion which follows, in one embodiment of the invention the only layer covering the surface of good solvent wettability in the first zone immediately prior to step (iv) is the overlayer which generally does not bond to it. In this case, there is just the overlayer to remove in step (iv) and this may be effected simply by washing.

In another embodiment, prior to step (iv) the surface of good solvent wettability is covered in the first zone by a layer of material which is chemically etchable and this layer may be removed by chemical attack thereby also simultaneously removing any layer or layers lying above it.

In yet a further embodiment, the surface of good solvent wettability may be exposed in that portion of the area which is to form the first zone by removal of the covering layers by ablation with a high energy beam while protecting that part of the area which is to form the second zone with a mask which is resistant to attack by the beam.

In some embodiments, the process involves depositing a further layer, e.g. to provide a mask over that portion of the area which is to provide the first zone, or to provide a surface of good solvent wettability where the substrate itself is not to provide that surface. Said further layer may be formed by providing the layer over the entire area and thereafter removing it from that portion of the surface where it is not required. Such selective removal of the layer may be effected, for example, by use of a chemical resist or photolithography or other like methods which involve forming a pattern in a protective film and then removing those portions of the layer where they are exposed through the pattern. Alternatively it may be removed by ablation by a high energy beam while protecting the portion which is not to be removed from the effect of the beam by a shield which is resistant to said high energy beam.

The process of the invention enables the siloxic layer to be deposited by preferred methods which comprise spin-, spray- and roll-coating a solution of silane and then heating the coated surface to drive off the solvent and cure the silane.

Organic fluorocompounds that provide surfaces of poor solvent-wettability include polymeric materials such as polymers of tetrafluoroethylene and hexafluoropropene, fluorinated hydrocarbons and fluorosilanes. By a fluorosilane we mean a compound having a silicon atom to which is attached a fluorinated organic groups. Particularly preferred are fluorosilanes containing at least one fluorine-containing group and at least one hydrolysable group since these combine good solvent non-wettability characteristics to a wide variety of solvents with resistance to attack by the solvents in question and the ability to form strong bonds with siloxic materials, especially siloxanes. Examples of suitable and preferred fluorosilanes and of methods for their deposition are described in our copending British patent application 8824436.3 and its counterpart U.S. application Ser. No. 07/415,726 filed Oct. 2, 1989.

The fluorosilane layer may be formed by vacuum deposition from vapour of the fluorosilane followed by heat to complete the bonding between the fluorosilane and the layer of siloxic material. Alternatively it may be applied as a solution in a suitable solvent which is then removed, e.g. by evaporation.

BRIEF DESCRIPTIVE OF THE DRAWINGS

The invention will now be described in greater detail with reference to several embodiments thereof and with the aid of the accompanying drawings which are diagrammatic sectional views, much enlarged and not to scale, illustrating the various stages of the process, and in which.

DETAILED DESCRIPTION OF THE INVENTION

In FIG. 1, 2 represents a substrate whose surface is to be provided with the zones of good solvent-wettability and poor solvent-wettability. Generally, this substrate may be, for example, metal, plastics or ceramic but the invention is particularly applicable to the case where it is formed of plastics material, especially high softening point plastics such as condensation polymers having aromatic residues, in particular polyamides, polyesters, polysulphones, polycarbonates and polyether ether ketones.

Figure 1A:
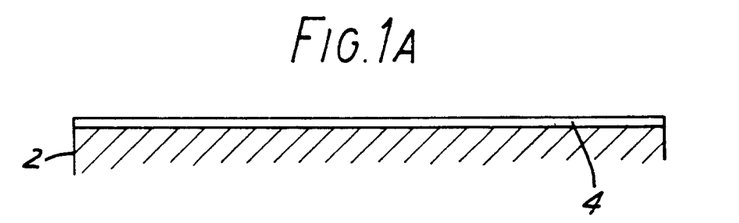
FIGS. 1A-1D illustrate one embodiment of the application of the invention to the case where the layer of siloxic material provides the surface for the zone of good solvent-wettability.

In the first step of this embodiment of the invention (FIG. 1A), an adherent layer 4 of siloxic material is provided over the whole of the surface area which is to be divided into the required zones.

Where the layer of siloxic material is silicon oxide it may be formed, for example, by sputtering. Preferably, however, the layer comprises organic siloxane because this is not only capable of forming a strong bond with the preferred organic fluorocompounds used to form the overlayer but also bonds strongly to the preferred substrate materials.

An adherent organic siloxane layer may be obtained by coating the surface with a silane and treating the coating to interlink the silane molecules of the coating, i.e. polymerise or cure the silane, by the development of Si—O—Si linkages. In general, this is achieved by choosing as the silane a compound having hydrolysable groups and a non-hydrolysable organic group attached to a silicon atom and hydrolysing at least some of said hydrolysable groups to form Si—OH groups which are then caused to react with corresponding groups, or with hydrolysable groups e.g. alkoxy groups, attached to Si atoms of other molecules in the layer, to form Si—O—Si linkages with loss of water or other by-product of the condensation.

Normally, the silane will be applied in the form of a solution, the solvent of which is then removed, e.g. by volatilisation.

Preferably all but one of the radicals attached to a silicon atom are hydrolysable groups. Preferably the hydrolysable groups are selected from alkoxy groups since the hydrolysis products are alcohols which, with appropriate choice of the solvent, can readily be removed with the solvent. Most preferably, the alkoxy group has up to 3 carbon atoms.

The nature of the remaining group attached to the silicon atom of the silane chosen to form the siloxane layer will depend at least in part upon the nature of the surface to be coated. The bond between the siloxane and the substrate may be chemical, e.g. by reaction of active groups in the silane with groups reactive therewith in the surface to be coated, or it may be physicochemical e.g. as in Van de Waal's bonds (that is, dipole-dipole bonding), hydrogen bonding or π—π bonding. For example, where the substrate is a polymer containing residues of a benzene or other aromatic or pseudoaromatic ring, e.g. as in aromatic polyimides, aromatic polyether-ether-ketones and aromatic polycarbonates, it may be preferred for the silane to contain at least one group having $\alpha,\beta$-ethylenic unsaturation, e.g. an allyl group. Alternatively, where, for example, the substrate surface contains OH groups and adequate adhesion by hydrogen-bonding is achievable, the silane may desirably contain at least one group containing an active or Zerewitinoff hydrogen atom, e.g. as in a primary or secondary aminoalkyl.

Preferably, therefore, the silane satisfies the formula $$YSi(OR)_3$$

where each R is an alkyl group and Y is a non-hydrolysable monovalent organic radical. Suitably, Y is a saturated or unsaturated monovalent hydrocarbon group or a substituted derivative thereof. For reasons such as availability or ease of synthesis of the compounds and cost, Y will generally be selected from alkyl and alkenyl groups especially those containing 1 to 6 carbon atoms, and substituted derivatives thereof wherein each substituent is selected from halogen, alkoxy and primary, secondary or tertiary amino. Examples of such groups are methyl, ethyl, allyl, methallyl, γ-aminopropyl, γ-methylaminopropyl, γ-dimethylaminopropyl, and methoxyethyl.

A particularly good combination of adhesion to the substrate surface and resistance to abrasion by the solvent-wettable surface to be provided in the product by the siloxane is obtained if the silane employed to form the adherent cured siloxane coating comprises a mixture of silanes which includes a silane containing a primary, secondary or tertiary aminoalkyl group; preferably a mixture of at least one first silane selected from primary, secondary and tertiary-aminoalkyl trialkoxysilanes and at least one second silane selected from alkyl trialkoxysilanes, preferably where the alkyl and alkoxy groups each contain up to 3 carbon atoms. Particularly good results are achieved from a mixture of a major amount of alkyl trialkoxysilane and a minor amount of aminoalkyl trialkoxysilane, e.g. from 75 to 60% by weight of the former and from 25 to 40% by weight of the latter. Examples of suitable compounds are methyl triethoxysilane and γ-aminopropyl triethoxysilane.

Preferably, the silane or silane mixture employed to form the siloxane layer is at least partially hydrolysed prior to its application to the substrate so as to facilitate subsequent curing of the layer. This may be achieved, for example, by standing a solution of the silane over water. Hydrolysis may be assisted by dilute acid.

Where the silane or mixture of silanes is applied as a solution, any suitable solvent or solvent mixture may be employed in the solution. Preferably, a solvent having a low boiling point is employed so that it is readily removable by evaporation. However, too high a rate of solvent removal may generate stresses in the layer which could lead to crazing. It may therefore be desirable to include a small proportion of a tail solvent.

One method of achieving the preferred cured siloxane layer thickness of not more than a few microns, e.g. 0.01 to 10 microns, is to apply a solution of the silane by spin-, spray- or roll-coating. Removal of the solvent and curing may be achieved by heat. It is preferred that the cured layer contains on the surface some hydroxyl groups attached to silicon atoms, i.e. Si-OH groups, since this appears to assist the bonding of the second layer. This may be achieved, for example, by effecting at least the final stages of the heating step in the presence of water vapour. However, this is not essential. Thus, one preferred method of forming the cured siloxane layer comprises spin-, spray- or roll- coating the surface with a solution of the silane wherein the silane is in an at least partially hydrolysed form, and thereafter heating the coated surface to drive off the solvent and cure the silane until an adherent coating is obtained.

The next step in the embodiment of the process of the invention (FIG. 1B) is the application, to that portion of the siloxic layer provided by the siloxane which is to form the zone of good solvent-wettability in the product, of a layer 6, hereinafter referred to as a masking layer, of a material that is etchable.

Figure 1B:
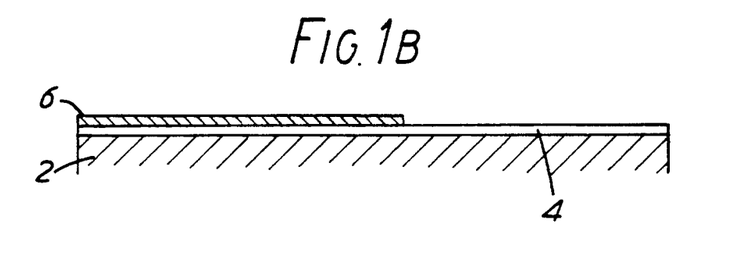

The masking may be effected in any suitable manner and using any suitable material provided of course that it is removable from the siloxic layer by an etching process that does not damage the siloxic layer. For example, the masking may be effected using a material which is soluble in a liquid composition which is substantially a non-solvent for the siloxic material employed. Examples are those metals which are dissolved by acid and water-soluble plastics materials e.g. polyvinyl alcohol. A preferred material is nickel.

The masking may be effected by any suitable means. In one preferred method where a metal such as nickel is employed as the masking material, the mask may be formed by sputtering.

In a preferred embodiment, the layer 6 is formed over the entire area and then that part of the mask which is in the portion of the area which is to form the second zone (providing the surface of poor solvent wettability) is removed. Suitable processes for achieving this include the use of resists or photolithography or similar means which involve forming a protective layer in the form of a pattern which leaves those areas of the mask to be removed exposed through the pattern, and thereafter removing the exposed areas of mask e.g. by etching such as by solvation or by ablation with a high energy beam.

Any high energy beam which is capable of ablating the material to be removed (in this case, the material of the mask) may be employed and examples of suitable techniques are laser ablation and plasma etching, sometimes known as ion milling. In plasma etching, the plasma is usually generated under vacuum and the ions so obtained may be directed at a predetermined energy level thus providing a means of controlling the rate of ablation. Laser ablation, however, has the advantage of being operable under normal atmospheric conditions.

It is preferred to use a beam which minimises heating of the material to be ablated. Preferred examples are the pulsed u.v. excimer lasers since all the energy of the beam tends to be absorbed in the top fraction of a micron of the material being ablated and there is very little heating. The ablation tends to occur by breakage of chemical bonds and conversion of the material into gas almost instantaneously.

Alternatively the layer may be deposited merely over that portion of the area which is to provide in the finished product the zone of good wettability.

In the next step of the process (FIG. 1C), the entire surface is coated with a layer 8 of organic fluorocompound which is capable of bonding to the siloxic material, of which layer 4 is formed. As indicated above, where the siloxic material is siloxane, the fluorocompound is preferably fluorosilane.

Figure 1C:
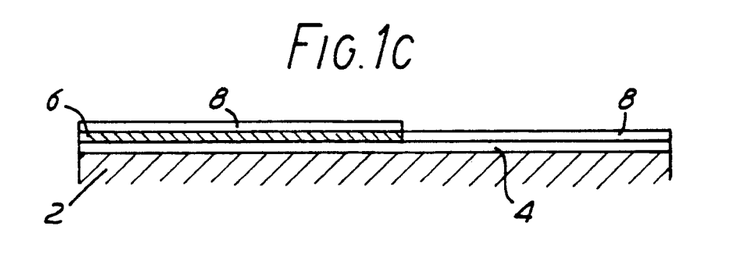

Very good results have been obtained where the fluorosilane contains at least one hydrolysable group and at least one fluorine-containing organic group, each attached to a silicon atom. In one embodiment, the fluorosilanes may be selected from those satisfying the formula:

$$R^2{}_m SiR^3{}_n$$

where m and n are integers, m is one or two, n is at least two, and the sum of m plus n is four, each $R^2$ is a fluorine-containing organic group and each $R^3$ is a hydrolysable group. Preferred hydrolysable groups are alkoxy, most preferably containing 1 to 3 carbon atoms.

While m may be 1 or 2, it is not thought that any improvement in anti-wetting properties is achieved where m is 2 and on the other hand the adhesion to the siloxic layer may be reduced. Therefore, it is preferred that m is 1 and n is 3.

The anti-wetting properties donated by the fluorosilane layer tend to be a function of the nature of $R^2$. In general, the anti-wetting properties improve with increase in the degree of fluorination of the terminal region of $R^2$; that is, the region of $R^2$ remote from the Si atom. Preferably $R^2$ will contain at least one $CF_3$-group in said terminal region.

The group to which the fluorine atoms are attached may be any suitable organic group, but generally it will be a saturated group, e.g. alkyl, alkoxyalkyl or alkylcarboxyalkyl.

For example, $R^2$ may have the structure $$X_3C\text{---}(CF_2)_x\text{---}(Z)_y\text{---}(CH_2)_z\text{---}$$

where each X is F or $CF_3$, Z is a divalent atom or group such as ---O---, each of x and z is zero or a positive integer and y is zero or one. One or more of the fluorine atoms in each ---$CF_2$---group may also be replaced by a ---$CF_3$ group, if desired.

Specific examples are:

$CF_3(CF_2)_9(CH_2)_2$---

$CF_3(CF_2)_5(CH_2)_2$---

$CF_3(CF_2)_3(CH_2)_2$---

$CF_3(CF_2)_xO(CH_2)_2$---

$(CF_3)_2CFO(CH_2)_3$---

$(CF_3)_3CCF_2OCH_2CH_2$---

One or more of the $R^2$ and/or $R^3$ groups may be replaced by another mono- valent atom or group, it being understood, of course, that the molecule retains at least one fluorine-containing group and at least one hydrolysable group and that said other group does not prevent hydrolysation or adversely affect the non-wetting properties of the coating to an undesirable extent.

In accordance with this modification, the fluorosilane may have the formula $$R^2{}_m SiR^3{}_n R^4{}_p$$

where $R^2$ and $R^3$ are as defined above, each $R^4$ is a non-hydrolysable atom or group other than $R^2$, m is 1 or 2, n is at least 1, p is 0, 1 or 2 and m+n+p=4.

An example of $R^4$ is F.

The fluorosilane layer may be formed by vacuum deposition from vapour of the fluorosilane and it has been found desirable to keep the humidity low to obtain the best adhesion. Preferably, the fluorosilane coating is heated. Alternatively the fluorosilane may be applied as a solution in a suitable solvent which is then removed, e.g. by evaporation.

It is not important for the fluorosilane layer to be particularly thick. Adequate results are obtained at thicknesses of 5 microns or less. A layer which is only a few molecules, e.g. one or two molecules, thick may be adequate.

Figure 1D:
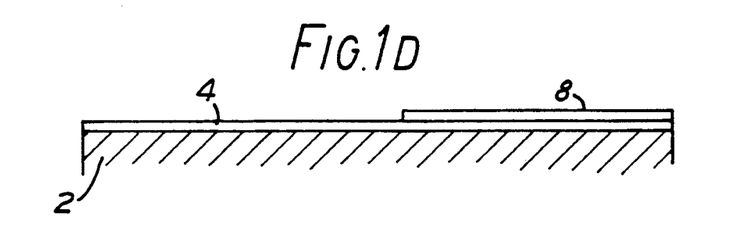

In the last step, the product is treated to remove the masking layer and that part of the organic fluorocarbon layer that is superimposed on it. If the masking layer is such that the organic fluorocarbon layer does not bond to it strongly, the latter may be removable simply by washing, thus exposing the masking layer for removal. Any suitable means may be employed for removing the masking layer which does not damage the siloxic layer underneath it.

In one embodiment, both the organic fluorocarbon layer and the masking layer may be removed in a single step by ablation using a high energy beam such as a laser, as described above, while protecting that part of the area which is to form the zone of poor solvent wettability with a shield that is resistant to the chosen method of ablation. An advantage of this procedure is that the same high energy beam ablation may be employed to sever the surface bonds of the thus-exposed surface of the layer of siloxic material and thereby improve its solvent wettability.

An alternative procedure involves attacking the masking material 6 with a solvent therefor. For example, where the mask is made of acid-soluble metal, an acid may be used which does not attack the siloxic layer. Where the mask is of nickel, a preferred solvent is aqueous acidic ferric chloride solution. The resultant dissolution of the mask will also result in the removal of the overlying layer 8 of fluorosilane, thereby re-exposing the layer 4 of siloxic material that was covered by the mask. As shown in FIG. 1D, the product thus comprises an area having a first zone the surface of which comprises siloxic material 4 which provides good solvent-wettability and a second zone the surface of which comprises organic fluorocompound 8 which provides poor solvent-wettability and which is firmly bonded to the substrate 2 by the layer 4 of siloxic material.

The invention may also be applied to the case where the zone of good solvent-wettability is provided by the surface of the substrate itself. Suitable substrates for use with this embodiment include, for example, high softening point plastics, especially condensation polymers containing aromatic residues, and in particular polycarbonates, polyimides, polysulphones, polyether-ether-ketones and polycarbonates; and glass.

Figure 2A:
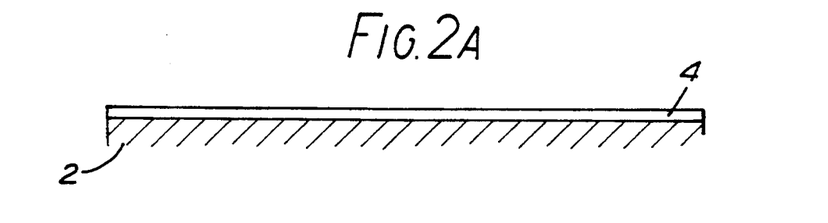
FIGS. 2A-2D illustrate an embodiment of the application of the invention to a case where the substrate surface itself provides the surface of good solvent-wettability.
Figure 2B:
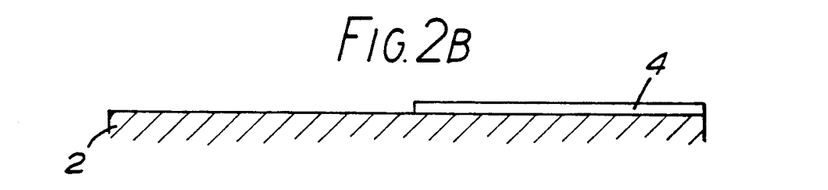

One method of achieving this will now be described with reference to FIG. 2. The first step of this method (FIG. 2A) is the same as that of the method described with reference to FIG. 1, namely the provision over the whole chosen area of the substrate 2 of a layer 4 of siloxic material. In the next step, however, the layer 4 is selectively removed from that part of the area which is to provide the zone of good solvent-wettability. Any suitable method may be used for such selective removal provided that it does not damage the substrate surface. Where the layer of siloxic material comprises siloxane, one preferred method comprises ablation by a high energy beam as described above, e.g. a laser beam. In this case, it may be desirable to include in the siloxane layer a photoabsorbing molecule to assist the ablation or to form the siloxane layer from a silane having good photoabsorption characteristics, or from a mixture of silanes which includes a silane having such characteristics. Examples of silanes having the desired characteristics are those which include aliphatic carbon-carbon unsaturation, e.g. as in an allyl group or a methalyl group. Alternatively, where the substrate is ablatable by a high energy beam such as a laser, the siloxane layer may be made sufficiently thin to be transparent to the beam chosen whereby a surface layer of the substrate itself is ablated, thereby simultaneously destroying the overlying layer of siloxic material. This process has the further advantage of severing surface bonds of the substrate and thereby improving its solvent wettability. Of course, that part of the layer of siloxane material which is not to be removed must be protected by a shield which is resistant to the high energy beam chosen.

Figure 2C:
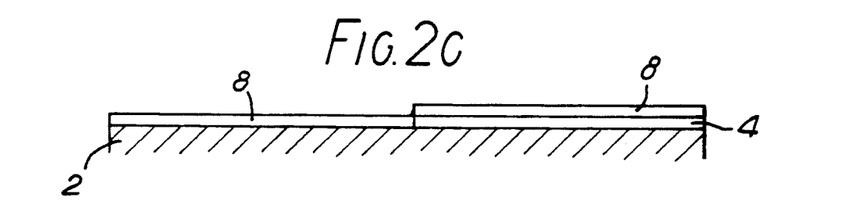
Figure 2D:
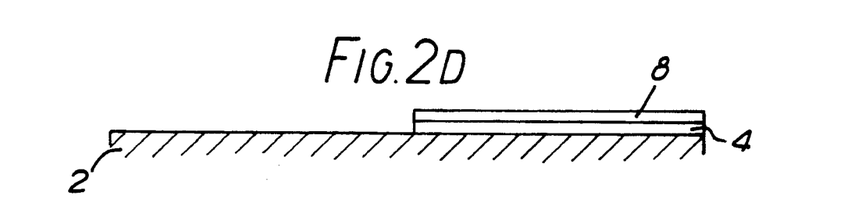

After the removal of part of the layer of siloxane material 4, the step of applying a coating 8 of organic fluorocompound over the entire area, and causing or allowing it to bond to that part of the surface which comprises the unremoved siloxic material (see FIG. 2C), is as described above with reference to the embodiment illustrated in FIG. 1. However, in this case the layer is in direct contact with the substrate in the zone where the layer of siloxic material has been removed. Thereafter, the final step comprises treating the product to remove that part of the fluorocompound coating which does not overlie, and is not bonded to, the siloxic layer. Any suitable means may be employed for achieving this. However, as the organic fluorocompound generally bonds only poorly to the substrate, treatment with a solvent or diluent in which the substrate is substantially insoluble or washing is usually sufficient. The resultant product (FIG. 2D) comprises a first zone having a solvent-wettable surface provided by the substrate 2 and a second zone having a surface with poor solvent-wettability provided by fluorosilane coating 8 bonded to siloxic layer 6.

Figure 3A:
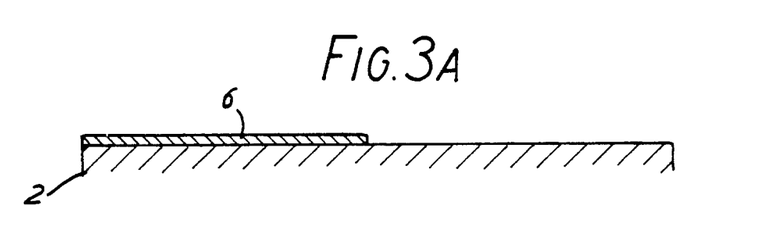
FIGS. 3A-3C illustrate another embodiment of the application of the invention to the case where the substrate surface itself provides the surface of good solvent-wettability.
Figure 3B:
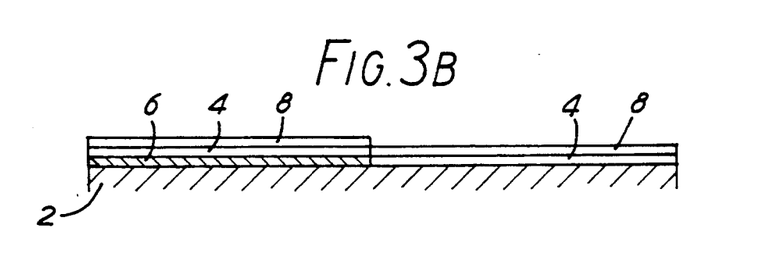

Another method of applying the process of the invention to the case where the zone of good solvent-wettability is provided by the substrate surface itself will now be described with reference to FIG. 3. In this embodiment, the first step (FIG. 3A) comprises forming a removable masking layer 6 on that part of the area of the substrate 2 which is to provide in the product the zone of good solvent-wettability. For the choice of material for the masking layer and the methods of forming it, reference may be made to the description above relating to forming the masking layer in the method illustrated in FIG. 1.

After the application of the masking layer, a layer 4 of siloxic material (FIG. 3B) is provided over the whole area of the substrate, followed by a coating 8 of organic fluorocompound. For the choice of material for, and the manner of deposition of, the layer and coating, reference may be made to the description above of the embodiment illustrated in FIG. 1. Finally (FIG. 3C), the product is treated to remove the masking layer and those parts of layers of siloxic material and organic fluorocompound that are superimposed on the masking layer to give a product having in essence the same structure as that illustrated in FIG. 2D.

Figure 3C:
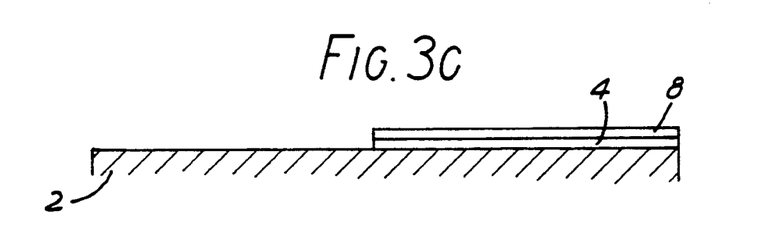
Figure 4A:
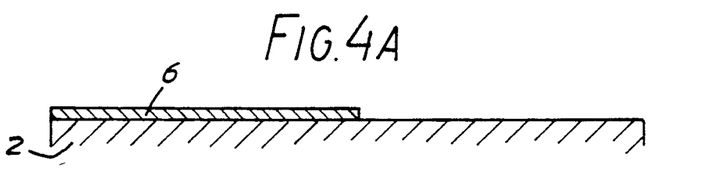
FIGS. 4A-4E illustrate yet another embodiment of the application of the invention to a case where the substrate surface provides the surface of good solvent-wettability.
Figure 4B:
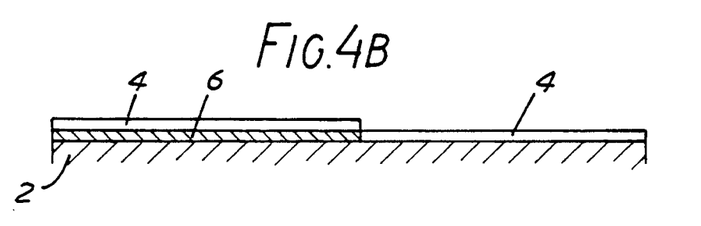
Figure 4C:
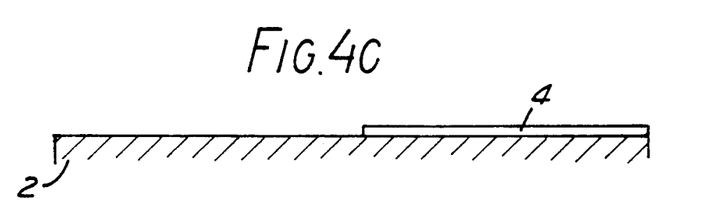
Figure 4D:
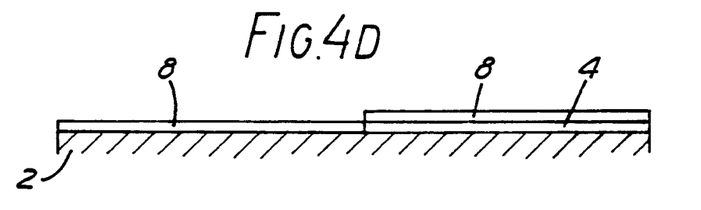
Figure 4E:
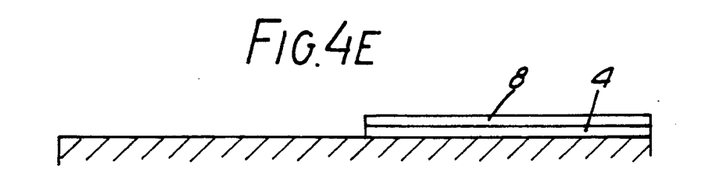

In one preferred embodiment, this is achieved by ablating the layers with a high energy beam as described above while protecting that portion of the area which is to form the second zone with a shield which is resistant to said beam. Alternatively, the product may be treated with a solution which will dissolve away the masking layer 6 thereby simultaneously also removing those portions of the layers 4 and 8 which overlie layer 6.

Yet another method of applying the process of the invention to the case where the zone of good solvent-wettability is provided by the surface of the substrate will now be described with reference to FIG. 4. The first steps of this embodiment (FIGS. 4A and 4B) are the same as those of FIG. 3, namely forming a masking layer 6 on that part of the area which is to provide the zone of good solvent-wettability in the product, and thereafter forming a siloxic layer 4 over the whole area. In the next step (FIG. 4C), however, the product thus obtained is treated to remove the masking layer, and that part of the siloxic layer which overlies the masking layer, from the portion of the area which is to provide the zone of good solvent-wettability. This may be effected, for example, by solvation of the masking layer or by ablation using a high energy beam, both of which methods are described above. Thereafter (FIGS. 4D and 4E), a coating 8 of organic fluorocompound is applied to the whole area and bonded to the siloxic material 4 which covers that part of the area which is to form the zone of poor solvent-wettability and thereafter the product is treated, e.g. by solvation or washing as described above, to remove that part of the coating 8 which does not overlie the siloxic material. The product thus has the same structure as that shown in FIG. 3C.

Figure 5A:
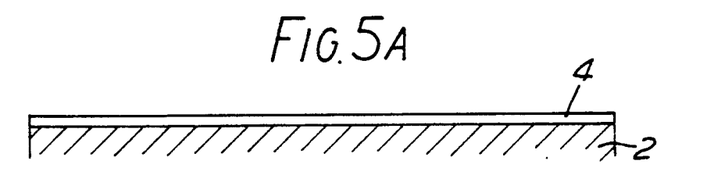
FIGS. 5A-5C illustrate another embodiment of the application of the invention to a case where the substrate surface provides the surface of good solvent-wettability.

A further method of applying the process of the invention to the case where the surface for the zone of good solvent-wettability is provided by the substrate is illustrated in FIG. 5.

Figure 5B:
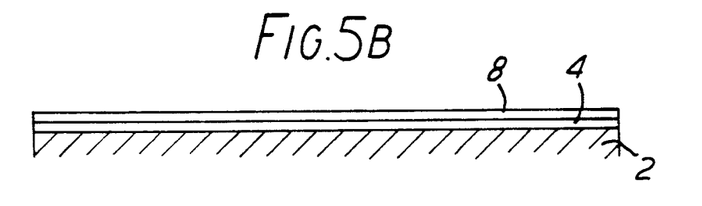

In this embodiment of the invention, the first step of the process (FIG. 5A) is the deposition of the layer 4 of siloxic material and this is followed in a second step by deposition of the layer 8 of organic fluorocompound (FIG. 5B). For the choice of suitable materials for each of these layers and the manner of their deposition, reference may be made to the earlier description, e.g. with reference to the method illustrated in FIG. 1.

The third and final step comprises removal of the parts of these two layers which lie in the portion of the area which is to form the zone having the surface of good solvent wettability whereby to expose the surface of the substrate 2 in that zone. Suitably this is effected by ablation using a high energy beam as described above, such as a laser, while the layers lying in the portion of the area which is to provide the zone of poor solvent wettability are protected by a shield which is resistant to the high energy beam chosen. This method may also be employed to ablate the surafce of the substrate immediately below the layers and thereby improve its solvent-wettability.

Alternatively, where the layers are relatively transparent to the high energy beam employed, the removal of the layers may be effected by ablation of the surface of the substrate thereby causing simultaneous destruction of the layers above.

Figure 5C:
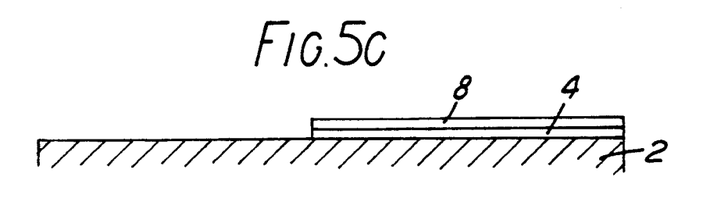
Figure 6A:
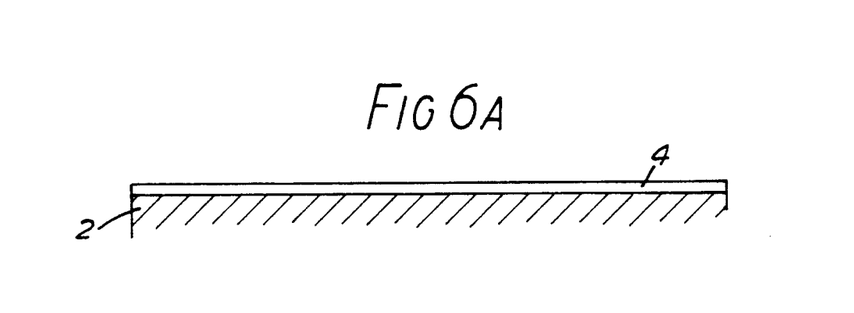
FIGS. 6A-6C illustrate one embodiment of the application of the invention to the case where the surface for the zone of good solvent-wettability is provided by a material other than that of the substrate or the siloxic layer.
Figure 6B:
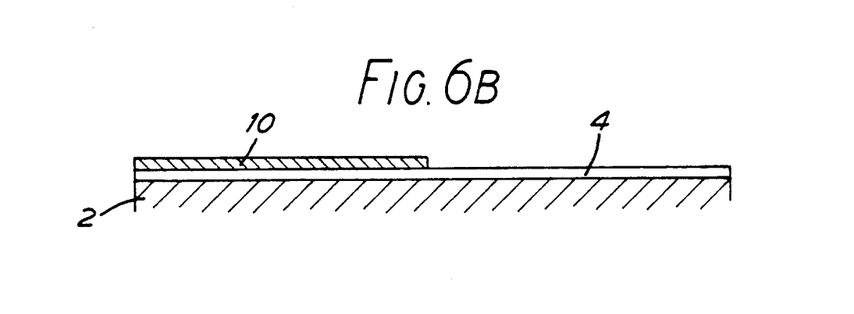
Figure 6C:
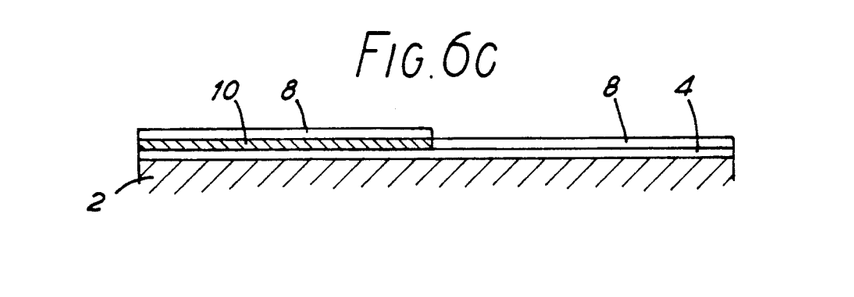
Figure 6D:
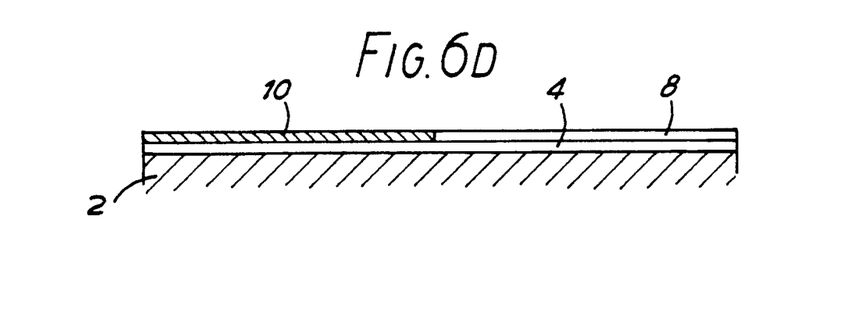

The result is the product illustrated in FIG. 5C which has in essence the same structure as the product of the process illustrated in FIG. 2.

The process of the invention may also be applied to the case where the surface for the zone of good solvent-wettability is provided by a material other than the siloxic material or the substrate. In this embodiment, which is illustrated in FIG. 6, the first step (FIG. 6A) comprises providing a layer 4 of siloxic material over the whole of the relevant area of the surface of the substrate 2, as described above, for example, with reference to the embodiment illustrated in FIG. 1 or FIG. 2. The next step, however, involves providing a layer 10 of a material chosen to provide the surface of good solvent-wettability to that part of the area which is to provide in the end product the zone of good solvent-wettability; see FIG. 6B. Any suitable material may be chosen provided it is capable of bonding strongly to the substrate and provides a surface which has good solvent-wettability and any method suitable for use with that material may be employed for forming the layer, e.g. deposition from solution, sputtering or vacuum deposition. In one embodiment, the layer may first be deposited over the entire area and then that part of the layer which is in the portion of the area intended to provide the zone having a surface of poor wettability may be selectively removed e.g. using any of the procedures described above with reference to the selective removal of a part of the masking layer 6 in the method illustrated in FIG. 1. Thereafter, the next step in the procedure is the application over the whole area of the coating 8 of organic fluorocompound (FIG. 6C) and the subsequent treatment to remove that part of the coating 8 which does not overlie, and is not bonded to, the layer 4 of siloxic material. As the nature of the material employed to form the layer 10 will usually be such that it forms no more than a weak bond with the layer 8 of organic fluorocompound, the latter may usually be removed from on top of the former simply by solution or washing. Alternatively it may be removed by ablation using a high energy beam, as described above, while protecting the remainder of the layer 8 using a shield which is resistant to attack by said beam. The product (FIG. 6D) contains a zone of good solvent-wettability provided by the surface of layer 10 and a zone of poor solvent-wettability provided by the surface of organic fluorocompound 8 superimposed on siloxic layer 4.

As indicated above, while not limited thereto, the process of the invention is particularly applicable to the treatment of the print-heads of drop-on-demand ink jet printers. One such application is now described with reference to FIG. 7 which shows in very diagrammatic form an exploded view of a printhead. Referring to the drawing, 100 represents the printhead which is provided with two lines of ink supply channels 102 (only some of which are shown) and air supply ducts 104 and 106. 108 is a nozzle plate which is located on the front of the printhead and is formed with nozzles 110 which communicate with the channels 102 and with ducts 114 and 116 which communicate with the air supply ducts 104 and 106, respectively. 118 is a housekeeping manifold which is to be bonded to the face of the nozzle plate and which is so designed as to enable air or other environmental fluid which is supplied through one or both of ducts 104/114 and 106/116 to be directed across the faces of the nozzles e.g. to clean them. For a fuller explanation of the form and purpose of the manifold 118, reference may be made to copending British patent application 8810241.3.

Figure 7:
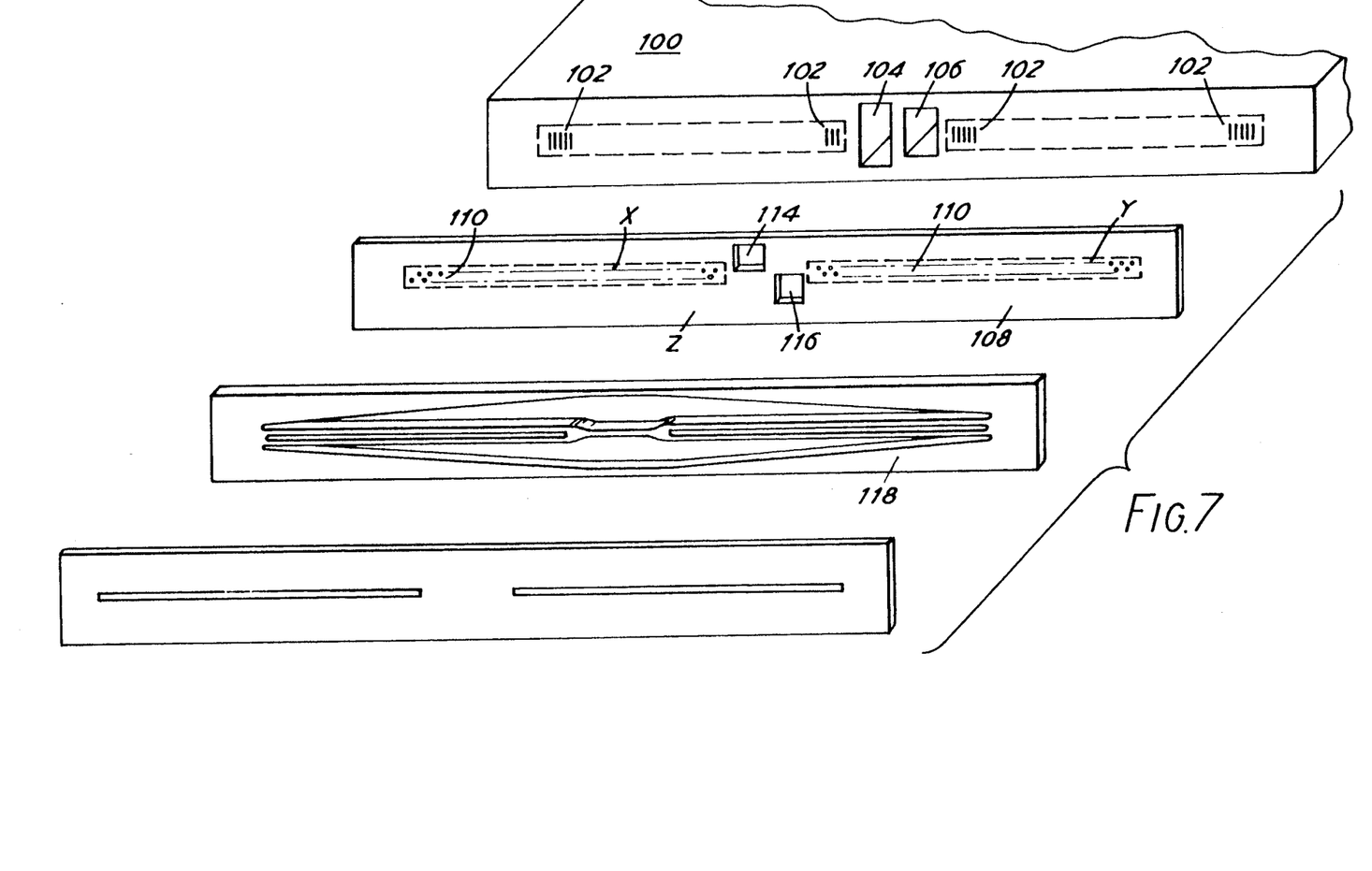
FIGS. 7 and 8 illustrate applications of the process of the invention to two different forms of nozzle plate for the printhead of a drop-on-demand ink jet printer.

For reasons that are not necessary to go into here, it is desirable for at least an annular area on the face of the nozzle plate surrounding each nozzle to be substantially non-wettable by the ink. At least part of the remaining area of the face, however, has to have a solvent-wettable surface if adequate bonding of the housekeeping manifold is to be achieved. One way of achieving this is to provide the whole of each of the two nozzle-containing zones X and Y, defined by the broken lines, with a surface which is substantially nonwettable by the ink and to make the remaining surface Z of the plate essentially solvent-wettable.

For some other designs of printhead, however, it has been found desirable to have an ink-wettable zone on the surface immediately surrounding the nozzle orifice. For example, it has been found that a small ink-wettable zone surrounding the orifice promotes uniformity in the direction of the ink jet ejected from the nozzle by virtue of the controlling effect of the viscosity of a small but controlled means of liquid immediately surrounding the orifice. This zone may be in the form of a narrow annulus surrounding the orifice and having a width of about half the diameter of the orifice.

A similar effect may be achieved by providing a plurality of such zones which together surround the orifice, e.g. four such zones which, together with the nozzle orifice, form the shape of an X with the orifice at the centre.

In general the distance between adjacent nozzles is typically 100 to 250 microns and the width of the small annular ink-wettable zone surrounding the nozzle is typically 10 to 20 microns.

Figure 8:
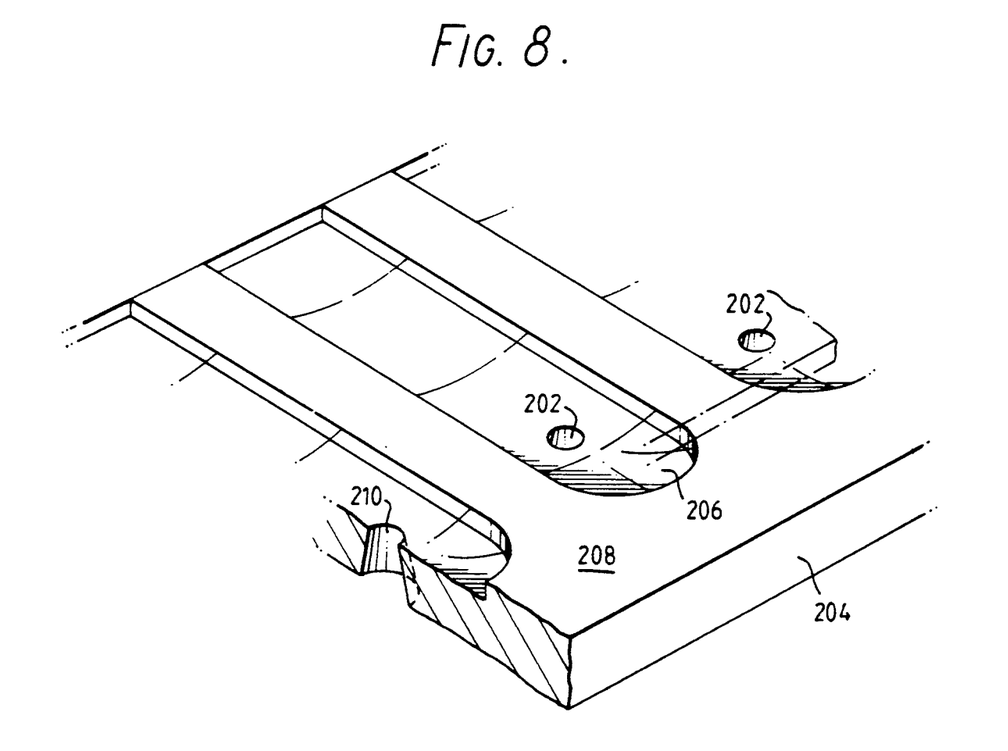

In yet another design of printhead, which is described, for example, in copending British patent application 8722085 and in published European Patent Publication No. 309,146 (Mar. 29, 1989) and an embodiment of which is illustrated in FIG. 8, each nozzle 202 which may be integral with the printhead itself or provided in a nozzle plate 204 which is bonded to the printhead, opens into a shallow trough 206 the surface of which is required to be wettable by the ink. The area 208 of printhead or nozzle plate surface surrounding the trough, however, is required to be substantially non-wettable.

In such designs of nozzle plate where the surface of a first zone surrounding the nozzle orifice is required to be wettable by the ink and this zone in turn is surrounded by a second zone the surface of which is required to be non-wettable, if the formation of the first zone by removal of overlying material in accordance with step (iv) of the process of this invention is effected by ablation using a beam of high energy and the nozzle plate is formed of a material or materials which are ablatable by the same high energy source, the steps of forming said first zone end forming the nozzle may be achieved in a single operation. For example, the removal of the overlying material from the surface having good solvent wettability whereby to form the first zone may be achieved by ablation using a first mask having an aperture which conforms with the shape of the zone and then the ablation may be continued using a second mask having a nozzle orifice-shaped aperture, to form the nozzle. The second, nozzle forming, step may be achieved, if desired, while effecting rocking motion between the plate and the high energy beam whereby to form a tapered nozzle, e.g. as described in copending British patent application 8722085 and as illustrated, for example, at 210 (FIG. 8).

Where the nozzle is located in a zone which is non-wettable to the ink it may also be possible to form the nozzle at the same time as forming the ink-wettable zone or zones on the nozzle plate by ablation using a high energy beam and employing a mask having apertures for the ink-wettable zones and nozzle-shaped apertures.

Many other variations and applications of the method of the invention will be apparent to those skilled in the art.

By means of the invention, products are readily obtainable which have a plurality of zones of poor solvent wettability spaced apart by zones of good solvent wettability, and vice versa, and wherein the spacing can be as small as tens of microns, and with surfaces of poor solvent wettability which are strongly bonded to the substrate, abrasion resistant, resistant to attack by a wide variety of solvents and yet having a very low level of solvent wettability to a wide variety of solvents, especially those employed in inks which are employed in drop-on-demand ink jet printers.

We claim:

1. A method of providing a substrate with a surface having an area which is divided into a first zone having good solvent-wettability and a second zone having poor solvent-wettability, said method comprising forming the surface of said second zone from organic fluorocarbon material which is bonded to said substrate by means of an interlayer comprising siloxic material, said method including the steps of:
   (i) providing the entirety of said area with a surface having good solvent wettability;
   (ii) providing said entire area with a first layer which comprises siloxic material which bonds to the substrate and which is in contact with the substrate over at least that part of the area which is to form said second zone;
   (iii) providing said entire area with an overlayer comprising organic fluorocompound which bonds to said first layer and provides a surface of poor solvent wettability, said overlayer being in contact with said first layer over at least that part of the area which is to form said second zone; and
   (iv) by etching or washing, removing overlying material from said surface having good solvent wettability over that part of the area which is to form said first zone whereby said surface is exposed.

2. A method as claimed in claim 1 in which said etching is effected by chemical attack or by ablation using a beam of high energy.

3. A method as claimed in claim 1 wherein the substrate provides the surface of good wettability.

4. A method as claimed in claim 3 which includes, prior to step (ii), the step of providing that portion of said area which is to form the first zone with a third layer which comprises etchable material, said third layer being located between the substrate and the layer of siloxic material, and step (iv) includes removing said third layer and all overlying layers from that portion of the area which is to form said first zone whereby the surface of the substrate in said portion is exposed.

5. A method as claimed in claim 4 in which step (iv) is accomplished by (a) removing the third layer and the overlying layer of siloxic material from that portion of the area which is to form said first zone before step (iii) and step (iv) comprises removing the overlayer from said portion of the area.

6. A method as claimed in claim 5, in which in step (iv) the overlayer is removed by washing.

7. A method as claimed in claim 4 in which the removal of the third layer from that portion of the area which is to form said first zone is by chemical attack.

8. A method as claimed in claim 4 in which said third layer is provided in that portion of the area which is to form the first zone by the steps of (a) providing said third layer over said area and then (b) removing said third layer from that portion of the area which is to form said second zone.

9. A method as claimed in claim 8 in which said third layer is removed in step (b) by chemical attack or by ablation using a high energy beam.

10. A method as claimed in claim 3 in which step (iv) comprises protecting the overlying material in that portion of the area which is to form the second zone against attack by a high energy beam and then removing said overlying material from that portion of the area which is to provide the said first zone by ablation using a high energy beam.

11. A method as claimed in claim 3 in which prior to step (iii) said layer of siloxic material is removed from that portion of the area which is to form said first zone and in step (iv) the overlayer is removed from that portion of the area which is to form said first zone.

12. A method as claimed in claim 11 wherein the layer of siloxic material is removed from that portion of the area which is to form the first zone by ablation using a high energy beam while protecting the layer of siloxic material which is in the portion of the area which is to form said second zone from attack by said beam.

13. A method as claimed in claim 1 wherein the layer of siloxic material provides the surface of good wettability.

14. A method as claimed in claim 10 in which in that portion of the area which is to form said first zone a third layer comprising etchable material is provided between said layer of siloxic material and said overlayer and step (iv) includes removing said third layer and said overlayer from that portion of the area which is to form said first zone whereby the surface of said layer of siloxic material is exposed.

15. A method as claimed in claim 1 wherein the surface having good solvent wettability is provided by a third layer.

16. A method as claimed in claim 15 which includes between steps (ii) and (iii) the step of providing said third layer in that portion of the area which is to form said first zone, and step (iv) comprises removing said overlayer from that portion of the area which is to form said first zone thereby exposing the surface of said third layer.

17. A method as claimed in claim 1 in which the substrate comprises a high softening point plastics material.

18. A method as claimed in claim 1 in which the substrate comprises a condensation polymer having aromatic groups.

19. A method as claimed in claim 1 in which the substrate comprises a polymer selected from polyimides, polyesters, polysulphones, polyether ether ketones and polycarbonates.

20. A method as claimed in claim 1 in which the substrate is an area of the surface of a printhead or nozzle plate of a drop-on-demand ink jet printer.

21. A method as claimed in claim 20 wherein the production of the first zone by step (iv) and the formation of a nozzle in a nozzle plate are both effected by ablation using a beam of high energy.

22. A method as claimed in claim 21 wherein the production of the first zone and the formation of the nozzle are effected in a single operation.

23. A method as claimed in claim 21 wherein the nozzle forming step is achieved while effecting a rocking motion between the nozzle plate and the high energy beam whereby to form a tapered nozzle is formed.

24. A printhead or nozzle plate of a drop-on-demand ink jet printer having a surface area comprising a first zone having good solvent wettability and a second zone having poor solvent wettability and wherein said area has been obtained by a process comprising forming the surface of said second zone from organic fluorocarbon material which is bonded to said printhead or nozzle plate by means of an interlayer comprising siloxic material, said process including the steps of:
  (i) providing the entirety of said area with a surface having good solvent wettability;
  (ii) providing said entire area with a first layer which comprises siloxic material which bonds to the printhead or nozzle plate and which is in contact with the printhead or nozzle plate over at least that part of the area which is to form said second zone;
  (iii) providing said entire area with an overlayer comprising organic fluorocompound which bonds to said first layer and provides a surface of poor solvent wettability, said overlayer being in contact with said first layer over at least that part of the area which is to form said second zone; and
  (iv) by etching or washing, removing overlying material from said surface having good solvent wettability over that part of the area which is to form said first zone whereby said surface is exposed.

* * * * *